United States Patent
Cowlard et al.

(10) Patent No.: US 9,869,786 B2
(45) Date of Patent: Jan. 16, 2018

(54) DATA ACQUISITION METHOD AND SYSTEM

(71) Applicant: Fugro N.V., Leidschendam (NL)

(72) Inventors: Andrew Paul Cowlard, Wallingford (GB); Angus James Stephen Ogilvie, Aberdeen (GB)

(73) Assignee: FUGRO N.V. (NL)

( * ) Notice: Subject to any disclaimer, the term of this patent is extended or adjusted under 35 U.S.C. 154(b) by 72 days.

(21) Appl. No.: 14/966,199

(22) Filed: Dec. 11, 2015

(65) Prior Publication Data

US 2016/0170056 A1    Jun. 16, 2016

(30) Foreign Application Priority Data

Dec. 12, 2014 (NL) ..................................... 2013966

(51) Int. Cl.
  *G01V 1/36* (2006.01)
  *G01V 1/38* (2006.01)

(52) U.S. Cl.
  CPC .............. *G01V 1/36* (2013.01); *G01V 1/3808* (2013.01); *G01V 1/3817* (2013.01); *G01V 2210/1423* (2013.01); *G01V 2210/56* (2013.01)

(58) Field of Classification Search
  CPC ...... G01V 1/3808; G01V 1/36; G01V 1/3817; G01V 2210/56; G01V 2210/1423
  USPC ............................................. 367/15, 20, 24
  See application file for complete search history.

(56) References Cited

U.S. PATENT DOCUMENTS

2011/0044127 A1    2/2011  Kostov et al.
2013/0135966 A1    5/2013  Rommel et al.

FOREIGN PATENT DOCUMENTS

EP    2775323 A2    9/2014

OTHER PUBLICATIONS

Dragoset et al., "Some remarks on surface multiple attenuation," Geophysics, vol. 63, No. 2 (Mar.-Apr. 1998); pp. 772-789.*
Search Report dated Aug. 20, 2015; The Netherlands Application No. 2013966.

* cited by examiner

*Primary Examiner* — Daniel L Murphy
(74) *Attorney, Agent, or Firm* — Polsinelli PC

(57) ABSTRACT

Disclosed is a system for acoustically exploring structure of a floor below a water body. The system can comprise a vessel, at least one streamer placed in the water and towed by the vessel. The system can also comprise a plurality of acoustic sensors positioned at regular intervals along the length of the streamer. The longitudinal direction of the streamer can make an angle with the horizontal. The system can also comprise a source for generating acoustic pulses placed in the water and towed by the vessel using a tow line. The tow line can have such length that the horizontal distance between the vessel and the source is larger than the horizontal distance between the vessel and the first sensor closest to the vessel and smaller than the horizontal distance between the vessel and the last sensor most remote from the vessel.

8 Claims, 5 Drawing Sheets

DATA ACQUISITION METHOD AND SYSTEM

CROSS REFERENCE TO RELATED APPLICATIONS

This application claims priority from Dutch Patent Application No. 2013966, filed Dec. 12, 2014, the contents of which are entirely incorporated by reference herein.

FIELD OF THE INVENTION

The present invention relates in general to the field of marine seismic exploration. More particularly, the present invention relates to a method and system for surveying the geological structure beneath the floor of an ocean or sea of water. In the following explanation, the term "sea" will be used to indicate the water, but the present invention is not limited to use in sea; for instance, the present invention can also be used in, for instance, a river or canal.

BACKGROUND OF THE INVENTION

A well-known method for obtaining subsurface structural information involves placing a sound source and a series of sensors in a body of water. A sound signal is generated. The sound wave travels down to the sea floor and beyond and is reflected from the sea floor surface and from other material interfaces below the sea floor surface. The reflected sound signal returns and is detected by the sensors. The system of source and sensors is moved along the survey profile and the emission of sound pulses is repeated at regular intervals as described above. As the system progresses, each subsurface reflection point (called a common mid-point or CMP) will be repeatedly sampled from many pairs of source and sensor positions. The sensed signals are processed to obtain information relating to the structure of the sub surface geology. More particularly, the sensors are placed at a longitudinal row along the length of a so-called streamer, which is towed by a vessel. The vessel may in fact tow multiple streamers arranged in parallel, to provide a moving 2D grid of sensors to collect 3D data.

A problem associated with this art is "ghosting". When the sound pulse is emitted, an energy wave front radiates from the source. Some energy will travel into the ground and return as useful primary reflection data. Some energy will be reflected from the sea surface and then travel into the ground. This energy will be time delayed and reverse polarity compared to the primary energy and is called the "source ghost". The same effect will be observed at the sensors with primary reflection data arriving first followed by the "receiver ghost" energy reflected down from the sea surface above.

The primary and ghost reflection data will both constructively and destructively interfere with each other. As a result of destructive interference, the sensor output signal has a frequency spectrum which contains a notch at certain frequencies which depend on the depth of the corresponding sensor or source below the water surface. The notch frequency fN is generally given by the expression $fN=c/2D$, in which c indicates the speed of sound in the medium and D indicates the depth of the sensor or source.

This ghosting problem as such is known, and measures have already been proposed to overcome this problem. One previously proposed solution is to use a slanted streamer so that individual sensors are located at mutually different depths. The ghosting phenomenon will then result in each sensor having different spectral characteristics. When data from the sensors is eventually summed, a uniform output spectrum will result because the location of the spectral notches will vary for each sensor contributing to the summation.

By way of a further example where a slanted streamer is deployed, reference is made to US patent application US-2013/0135966-A1. In the method and system disclosed in this document, two reflection measurements with the same separation between source and receiver (called the "offset") are performed at the same CMP position. One measurement is made with the source at one side of a sensor ("upstream"). The system then moves along the survey profile until the source is in the same position as the sensor in the first measurement. Another measurement from the same CMP is then made with the source at the opposite side of a second sensor ("downstream"). Because the streamer is slanted, the depth of the second sensor will be different from the depth of the first sensor with correspondingly different spectral notches. The sensor signals resulting from these two measurements are de-ghosted during processing using established techniques.

SUMMARY OF THE INVENTION

In the de-ghosting scheme as disclosed in US-2013/0135966-A1, a first source is positioned at one end of a streamer that is towed by a first vessel. A second source is towed by a second vessel behind the first vessel and its towed equipment. There are disadvantages with this design as follows:

The use of two vessels increases operational expense
The two sources may not have identical characteristics
There is a point in the middle of the streamer where no spectral differentiation occurs.

An objective of the present invention is to eliminate the above drawbacks.

In the system and method pertaining to the present invention, a source is positioned halfway down the streamer. A sound pulse is emitted and a first measurement is made into sensors both upstream and downstream of the source. The system progresses along the survey profile by a distance equal to the CMP interval, or some suitable multiple thereof, and a second measurement is made. This procedure is repeated along the length of the survey profile. As the measurement population builds, it can be seen that at each CMP position there will be pairs of observations taken whereby the distance between source and sensor is the same but their positions are mutually reversed. In other words, in each pair of observations the source is upstream of the sensor in one and downstream in the other. As each of the sensors will be from a different location in the streamer and therefore be towed at a different depth, they will have differing spectral notch characteristics. Because the same point in the ground is being sampled by the pair of observations, it can be assumed that the only variable differentiating the two observations is the spectrum. This assumption allows the de-ghosting of data during processing using established techniques.

An important advantage of the present invention is that the signals to be combined for de-ghosting purposes originate from one and the same source, so that the signals as transmitted by the source will have substantially the same characteristics, and the de-ghosting solution will have improved accuracy.

In a specific embodiment, the present invention provides a system for acoustically exploring structure of a floor below a water body, the system comprising:

a vessel;

at least one streamer placed in the water and towed by the vessel and comprising a plurality of acoustic sensors positioned at regular intervals along the length of the streamer, wherein the longitudinal direction of the streamer makes an angle with the horizontal;

a source for generating acoustic pulses, the source being placed in the water and towed by the vessel;

a tow line connecting the source to the vessel;

wherein the tow line has such length that the horizontal distance between the vessel and the source is larger than the horizontal distance between the vessel and the first sensor closest to the vessel and smaller than the horizontal distance between the vessel and the last sensor most remote from the vessel.

In such design, there are always at least two sensors with the same offset arranged at mirrored sides of the source so that their signals can be de-ghosted.

In a preferred embodiment, the tow line has such length that the horizontal distance between the vessel and the source is substantially equal to half the summation of the horizontal distance between the vessel and the first sensor closest to the vessel and the horizontal distance between the vessel and the last sensor most remote from the vessel. In such design, for each sensor there exists another sensor with the same offset arranged at the mirrored side of the source.

Further, an aspect of the present invention involves a method for acoustically exploring bottom structure of a floor below a water body, the method comprising the steps of:

a) arranging a series of N sensors equidistantly along a streamer, wherein N indicates the number of sensors;

b) arranging the streamer in the water in a slanting orientation;

c) arranging a source for generating acoustic pulses above the streamer, at a horizontal position approximately midway between the horizontal positions of the two extreme sensors;

d) towing the source and the streamer by a common vessel;

e) actuating the source to produce an acoustic pulse;

f) using an i-th sensor $4(i)$ positioned closer to the vessel than the source to receive a reflection signal and generate a first measurement signal $S(i)$;

g) displacing the vessel over a distance equal to $(N+1-2i)\cdot d/2$, with d representing the horizontal distance between the sensors;

h) actuating the source to produce an acoustic pulse;

i) using the $(N+1-i)$th sensor $4(N+1-i)$ to receive a reflection signal and generate a second measurement signal $S(N+1-i)$;

j) combining the first and second measurement signals to perform a de-ghosting operation and to provide a de-ghosted measuring signal.

Further, an aspect of the present invention involves a method for acoustically exploring bottom structure of a floor below a water body, the method comprising the steps of:

a) arranging a series of N sensors equidistantly along a streamer, wherein N indicates the number of sensors;

b) arranging the streamer in the water in a slanting orientation;

c) arranging a source for generating acoustic pulses above the streamer, at a horizontal position approximately midway between the horizontal positions of the two extreme sensors;

d) towing the source and the streamer by a common vessel;

e) actuating the source to produce an acoustic pulse at a predetermined location (x);

f) using each sensor $4(i)$ to receive a reflection signal and generate a respective measurement signal $S(i,x)$;

g) receiving and storing all measurement signals $S(i,x)$ from all sensors $4(i)$;

h) displacing the vessel over a distance equal to d/2, with d representing the horizontal distance between the sensors;

i) repeating steps e), f), g) and h) at successive times t(j) increments along the survey profile;

j) for each signal $S(i, x+i-1)$ obtained from the i-th sensor $4(i)$ at a location $(x+i-1)$, selecting the signal $S(N+1-i, x+N-i)$ obtained from the $(N+1-i)$th sensor $4(N+1-i)$ at location $(x+N-i)$ to obtain a set of N/2 pairs of matching measurement signals relating to the same reflection point;

k) for each pair in the set, comparing the matching measurement signals to perform a de-ghosting operation and to thus provide a set of de-ghosted measuring signals relating to the same common mid-points.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

It is first noted that the art of surveying the sub-surface geology of a water-filled basin, such as for instance a river, a sea, an ocean, using the reflection of sound waves, is known per se. Sources for generating suitable sound pulses, and sensors for detecting sound waves, are likewise known per se, and so are methods for processing the sensor output signals such as to derive the required information relating to geological structure. The present invention is not claiming to improve on this hardware and methods, and in fact the present invention can be practiced using presently existing components as well as future improved components. Therefore, it is not necessary here to give a description of build and operation of such components. For more background information, reference is made to the document US-2013/0135966-A1 already mentioned above.

Figure 1:
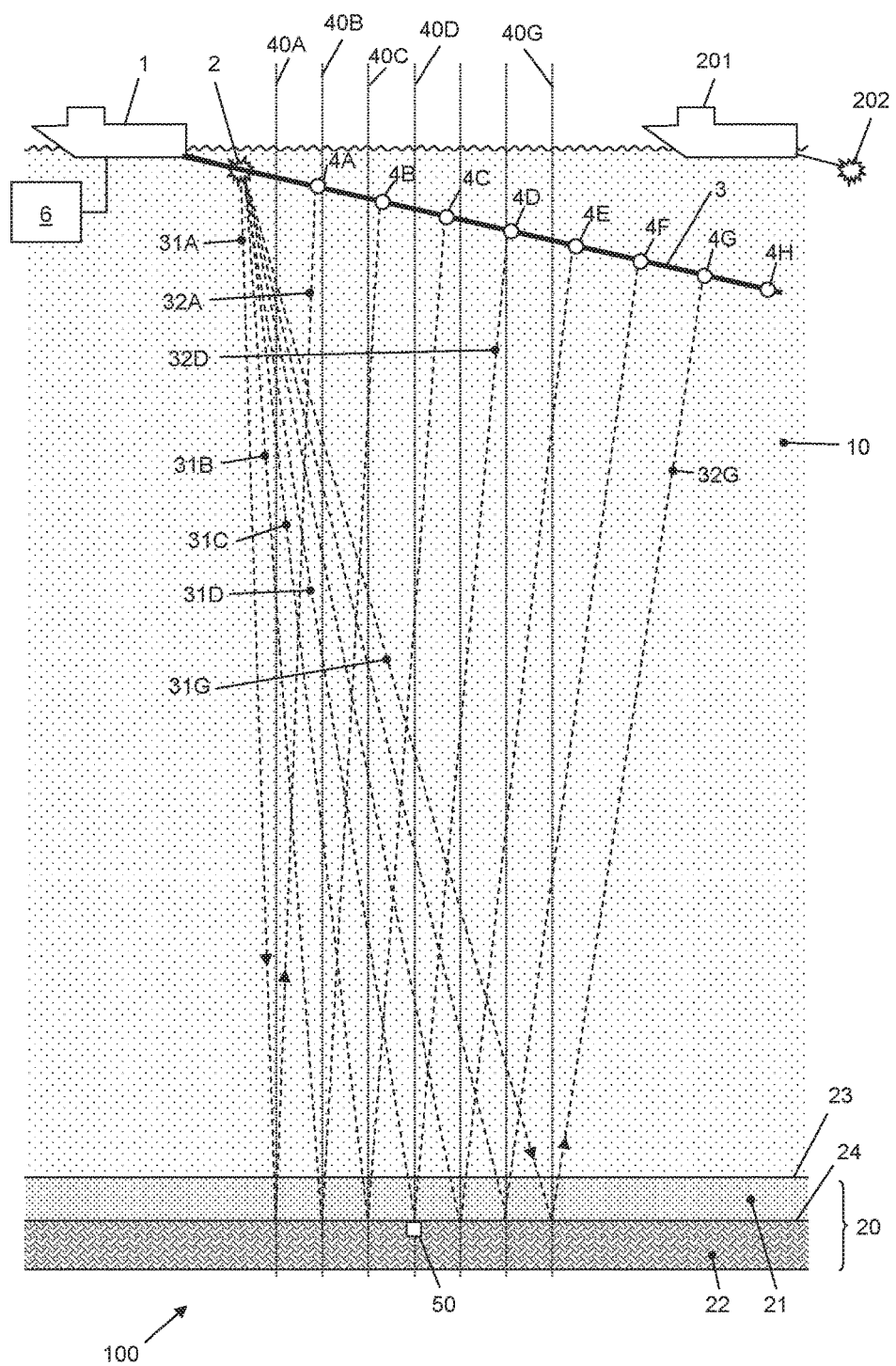
FIGS. 1 and 2 schematically illustrate a prior art system for acoustically exploring bottom structure.

FIG. 1 schematically illustrates the geometry of a prior art system 100 for acoustically exploring sub-surface geological structure. Reference numeral 10 indicates a water body such as a sea, having a sea floor 23. The sub-surface 20 in this example is layered, and comprises an upper layer 21 and a second layer 22. The interface between upper layer 21 and second layer 22 is indicated as second layer surface 24.

The system 100 comprises a vessel 1 towing a suitable sound source 2 and a streamer 3 comprising a plurality of acoustic sensors 4. In an example, the sound source 2 comprises an air gun. Whilst a streamer may contain many hundreds of sensors, only 8 sensors are shown in the diagram for sake of simplicity. For distinguishing individual sensors, a letter A, B, C will be added to reference numeral 4, while sensors in general will be indicated by the general numeral 4. A second vessel 201 is also deployed, towing a second energy source 202. It should be noted that the distance between source 2 and the nearest sensor 4A is equal to the distance between source 202 and the nearest sensor 4H.

The streamer 3 has a slanted orientation, i.e. the longitudinal direction of the streamer 3 makes an angle with the horizontal, such that a sensor more remote from the vessel 1 is at a greater depth than a sensor closer to the vessel. It should be noted that FIG. 1 is not drawn to scale and that, in particular, the angle of slant of the streamer is exaggerated.

A sound pulse is generated by source 2. The sound typically spreads in all directions. To aid explanation, let us consider the path of sound energy being reflected at surface 24. For simplicity, any refraction effects are ignored. A sound wave travels downwards along a down path 31, reflects from surface 24 and travels upwards along an up path 32 towards a sensor 4. Down paths 31 and up paths 32 corresponding to specific sensors are likewise provided with letters A, B, C, etc. Virtual vertical lines 40A, 40B, 40C etc are drawn at the common mid-point (CMP) locations, whereby the horizontal distance between the sensor 4i and its corresponding normal line 40i is approximately equal to the horizontal distance between this normal line 40i and the source 2.

Both the distribution of the deployed equipment relative to the vessel position and the progression of the dual vessel system along the survey profile are governed by the established industry concept of common mid-point (CMP) data gathering. An assumption of this concept is that reflections from the sea floor, and the geological structures below, originate from a location mid-way between the energy source and the sensor. It can be readily seen that the distance between adjacent CMPs is half the distance between adjacent sensor positions. Also, as the vessels progress along the survey profile, a pulse is emitted from the sources at a regular distance interval, equal to the distance between CMP positions. In this way, a consistent number of observations are made at each CMP over a range of source to sensor separations.

Figure 2:
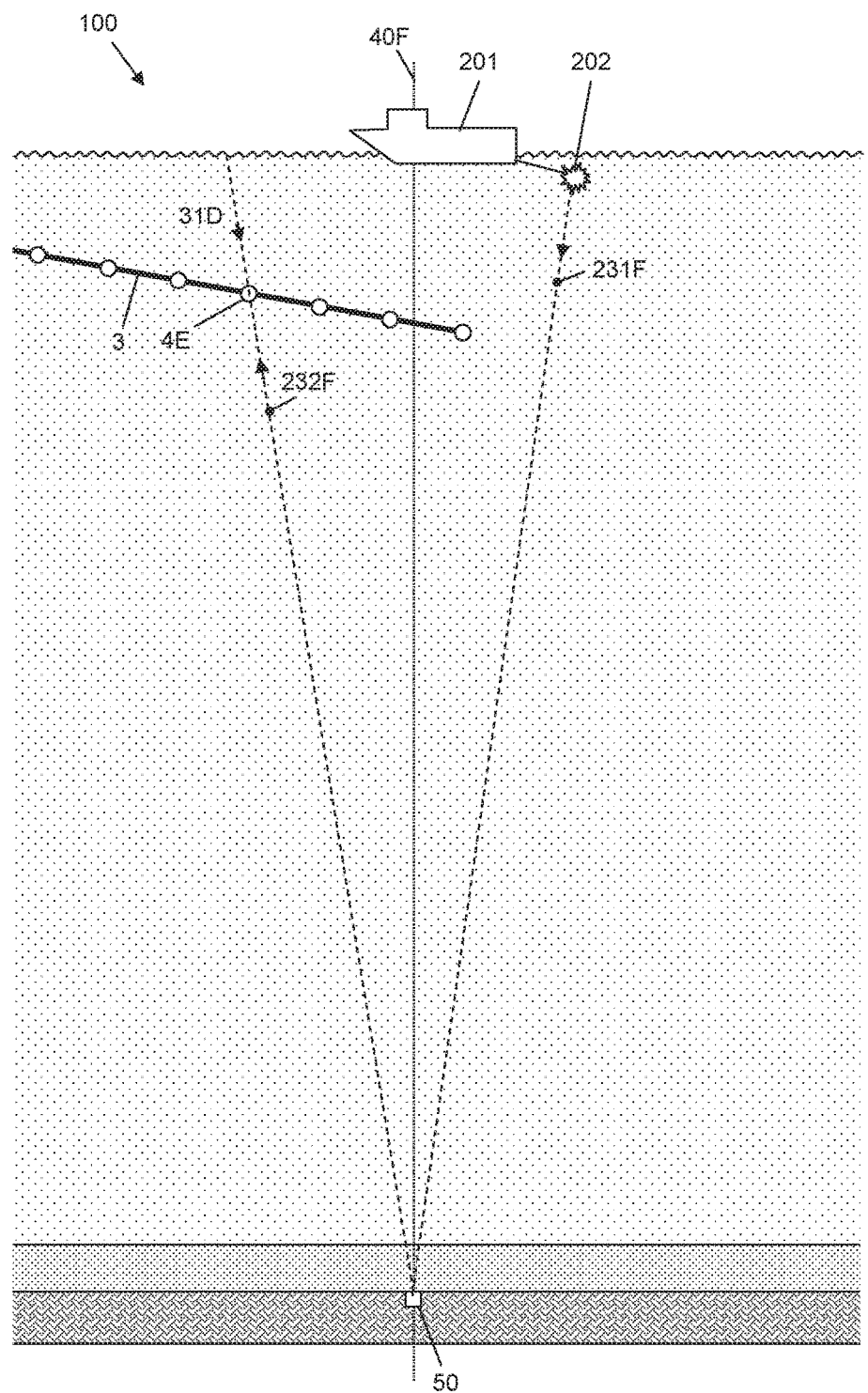

Consider the observations made at CMP number 50 in FIGS. 1 and 2. FIG. 1 illustrates that CMP 50 will be sampled by sound energy emitted from source 2 and received at sensor 4D. After the dual-vessel system has progressed along the survey profile, CMP 50 will again be sampled by sound energy from source 202 received by sensor 4E as shown in FIG. 2. In both cases, the separation of the energy source and the sensor are equal. In addition, if the information received at sensors 4D and 4E is time corrected to the same datum to compensate for the difference in vertical position, the travel time of the sound energy is equal in both cases. The two observations, or records, are therefore reciprocal, the only difference between them being the spectral characteristics associated with the differing receiver ghosts. This being the case, the two records can be de-ghosted using established seismic data processing techniques.

It can be seen that the illustration above with respect to CMP 50 can be extended to all records gathered into all CMPs in that there will always be reciprocal pairs of sources and sensors generated when the system described above is deployed.

Figure 3:
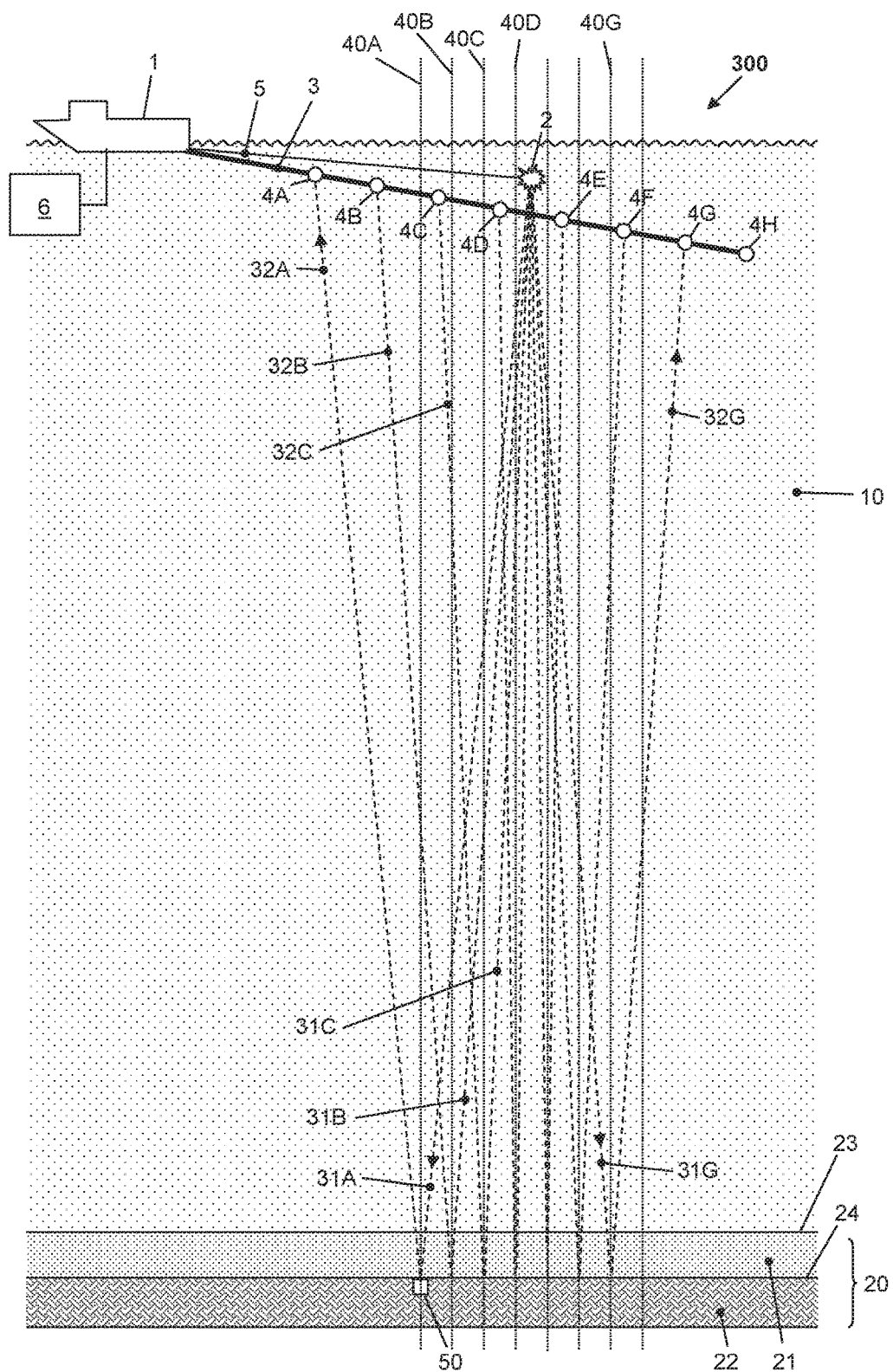
FIGS. 3 and 4 schematically illustrate an exemplary embodiment of an inventive system for acoustically exploring bottom structure.

FIG. 3 illustrates a system 300 that differs form the system 100 of FIG. 1 in that the sound source 2 is connected to the vessel 1 by a tow line or umbilical 5, that is longer than in prior art. In particular, in prior art the tow line 5 is relatively short so that the sound source 2 is located before (i.e. closer to the vessel 1 than) the first sensor 4A (i.e. the sensor closest to the vessel 1). According to the present invention, the tow line 5 is relatively long, such that, when considered in the horizontal direction, the sound source 2 is located between the first sensor 4A and the last sensor 4H (i.e. the sensor most remote from the vessel 1). In the preferred embodiment as shown, the sound source 2 is located midway between the first sensor 4A and the last sensor 4H (i.e. the horizontal distance between the sound source 2 and the first sensor 4A is substantially equal to the horizontal distance between the sound source 2 and the last sensor 4H. It should be noted that the number of sensors has been restricted for the purposes of illustration. In reality there would normally be considerably more sensors located along the streamer.

Figure 4:
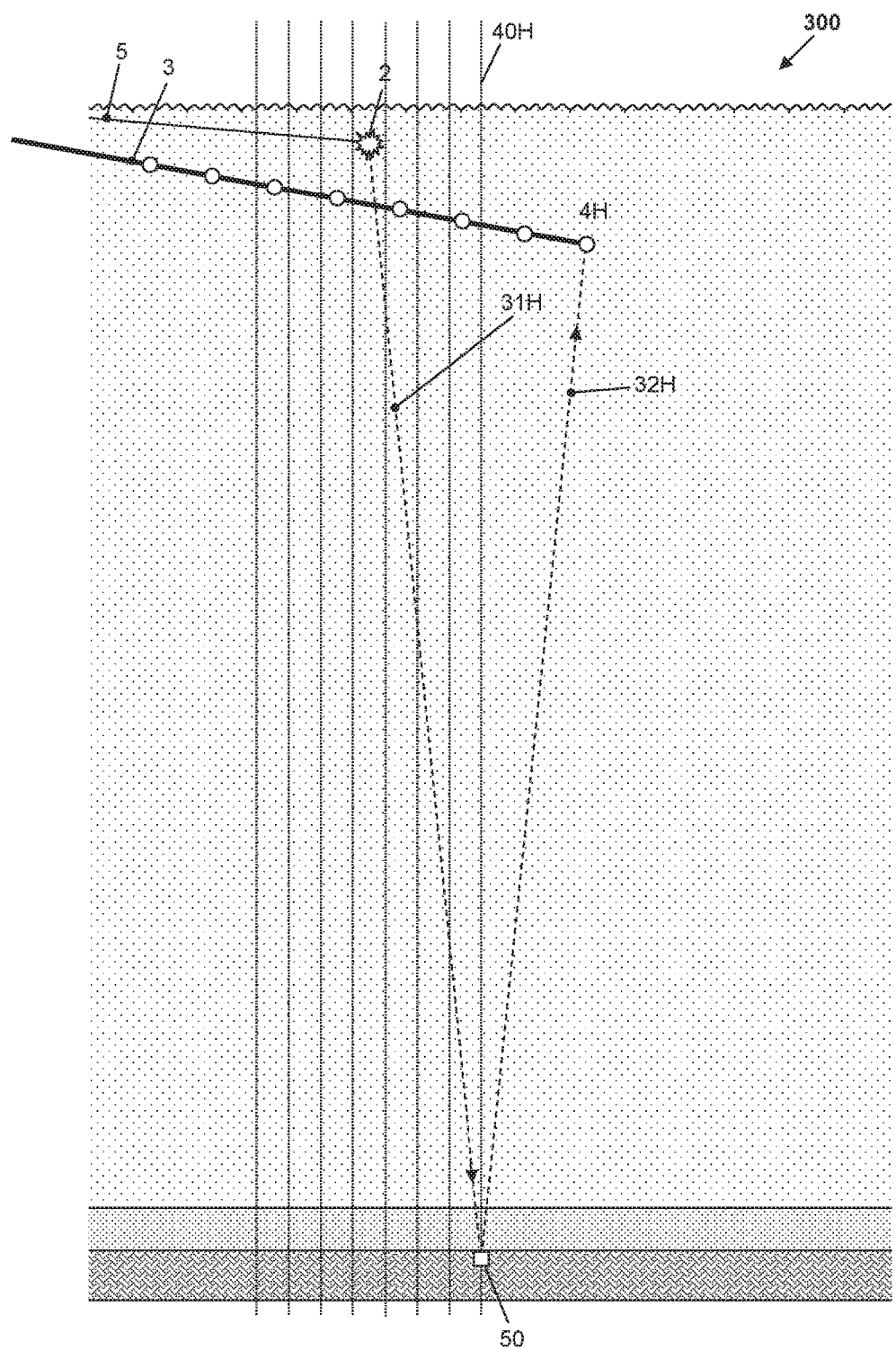

In FIG. 3, a sound pulse is emitted from source 2 and reflected energy is recorded at sensors 4A to 4H. Consider the observations made at CMP 50. Energy reflected from this position will be recorded at sensor 4A. The vessel and the towed equipment advance along the survey profile and sound pulses are emitted at regular intervals equal to the distance between adjacent CMPs. In FIG. 4 we see that the vessel and towed equipment have progressed to a new position whereby the source 2 is now at the same location as sensor 4A was in FIG. 3, sensor 4H is at the same location as source 2 in FIG. 3 and reflected energy from CMP 50 is again being recorded. The horizontal distances between source 2 and sensors 4A and 4H are the same and therefore the travel time of the energy reflected at CMP 50 will be the same. The only difference between the two sets of data will be spectral characteristics resulting from the difference in depth of the sensors 4A and 4H and the associated receiver ghost effects. As a result, the two records can be de-ghosted using established seismic data processing techniques.

It can be seen that the illustration above with respect to CMP 50 can be extended to all records gathered into all CMPs in that there will always be coincident, reciprocal pairs of sources and sensors when the system described above is deployed. This will result in pairs of recorded data with different spectral properties but which are otherwise identical, thereby facilitating de-ghosting during data processing. This de-ghosting processing step is otherwise identical to the de-ghosting processing step associated with the prior art referenced above and need not be explained further.

Figure 5:
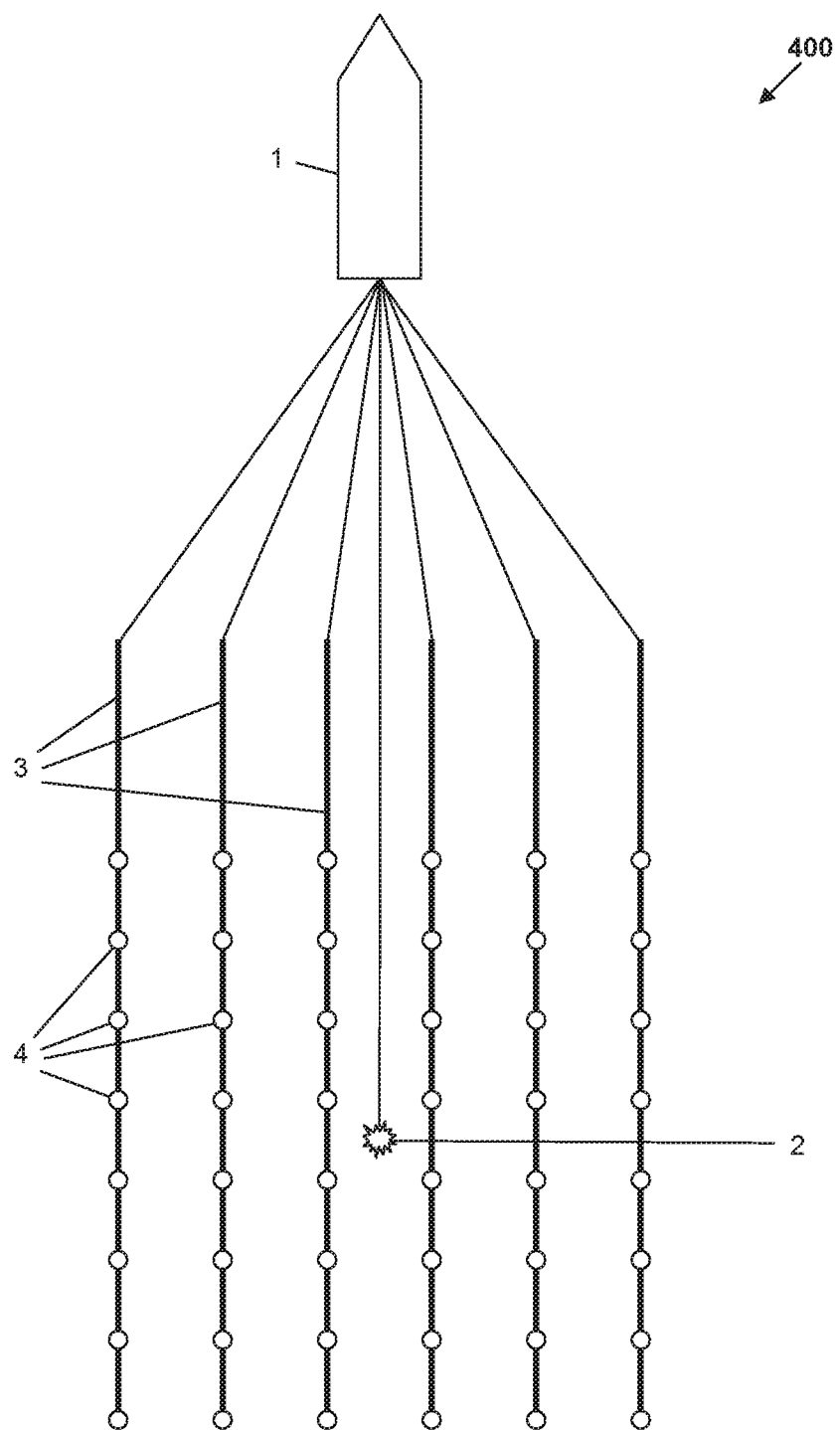
FIG. 5 schematically illustrate another exemplary embodiment of an inventive system for acoustically exploring bottom structure.

A further embodiment of the invention is illustrated in FIG. 5 whereby a system for the gathering of acoustic data is schematically shown in plan view. The system 400 comprises a source 2 and two or more streamers 3 arranged in parallel, equidistant from each other and linearly slanted in the water. The source 2 is again located mid-way along the sensor-provided length of the streamer set, i.e. in the center of the sensor set. Sound energy emitted from the source will be reflected and returned to the sensors 4 located in the streamers. The system will move along the survey profile and sound energy will be emitted by the source at regular intervals equal to the distance between adjacent CMPs. A set of CMP tracks will be generated from each streamer with each track being located mid-way between the source and the associated streamer. As described in the previous embodiment, pairs of observations will be made at each CMP whereby the source and sensor have the same separation but their positions are reversed. This arrangement facilitates the de-ghosting of the data during processing as described above.

From the above, it is clear that the invention has succeeded in providing a relatively simple design for a system that is capable of providing sensor signals that allow for deghosting.

It should be clear to a person skilled in the art that the present invention is not limited to the exemplary embodiments discussed above, but that several variations and modifications are possible within the protective scope of the invention as defined in the appending claims. For instance, in FIG. 5 six streamers 3 in parallel are shown, with the source 2 located between the third and fourth streamer, but the number of streamers may be 2, 3, 4, 5, 7 or higher.

Even if certain features are recited in different dependent claims, the present invention also relates to an embodiment comprising these features in common. Any reference signs in a claim should not be construed as limiting the scope of that claim.

What is claimed:

1. A system for acoustically exploring structure of a floor below a water body, the system comprising:
    a vessel;
    at least one streamer placed in the water body and towed by the vessel and comprising a plurality of acoustic sensors positioned at regular intervals along a length of the streamer, wherein a longitudinal direction of the streamer forms an angle with a horizontal direction;
    a processor coupled to the plurality of sensors for receiving measurement signals (S(i)) from the respective sensors, the processor is adapted to combine the received measurement signals $S(i)$ and $S(N+1-i)$ to perform de-ghosting, wherein i ranges from 1 to N while N indicates the number of sensors along the streamer;
    a source for generating acoustic pulses and being placed in the water body and towed by the vessel; and
    a tow line connecting the source to the vessel;
    wherein the tow line has such length that a horizontal distance between the vessel and the source is larger than a horizontal distance between the vessel and a first sensor closest to the vessel and smaller than a horizontal distance between the vessel and a last sensor most remote from the vessel.

2. The system according to claim 1, wherein the tow line has such length that the horizontal distance between the vessel and the source is substantially equal to half a summation of the horizontal distance between the vessel and the first sensor closest to the vessel and the horizontal distance between the vessel and the last sensor most remote from the vessel.

3. The system according to claim 1, wherein the source is located above the streamer.

4. The system according to claim 3, wherein the source is located at a higher level than the first sensor closest to the vessel.

5. The system according to claim 1, further comprising two or more streamers arranged in parallel to each other.

6. The system according to claim 1, wherein the source is controlled to generate sound pulses at a repetition frequency equal to or at an integer multiple of $2V/d$, wherein d representing a horizontal distance between the sensors and V representing a horizontal velocity of the vessel.

7. A method for acoustically exploring bottom structure of a floor below a water body, the method comprising:
    a) arranging a series of N sensors equidistantly along a streamer, wherein N indicates the number of sensors;
    b) arranging the streamer in the water body in a slanting orientation;
    c) arranging a source for generating acoustic pulses above the streamer, at a horizontal position approximately midway between horizontal positions of a first sensor and a last sensor;
    d) towing the source and the streamer by a common vessel;
    e) actuating the source to produce an acoustic pulse;
    f) using an i-th sensor positioned closer to the vessel than the source to receive a reflection signal and generate a first measurement signal $S(i)$;
    g) displacing the vessel over a distance equal to $(N+1-2i)\cdot d/2$, wherein d representing a horizontal distance between the sensors;
    h) actuating the source to produce an acoustic pulse;
    i) using the $(N+1-i)$th sensor to receive a reflection signal and generate a second measurement signal $S(N+1-i)$;
    j) combining the first and second measurement signals to perform a de-ghosting operation and to provide a de-ghosted measuring signal.

8. A method for acoustically exploring bottom structure of a floor below a water body, the method comprising:
    a) arranging a series of N sensors equidistantly along a streamer, wherein N indicates the number of sensors;
    b) arranging the streamer in the water body in a slanting orientation;
    c) arranging a source for generating acoustic pulses above the streamer, at a horizontal position approximately midway between horizontal positions of a first sensor and a last sensor;
    d) towing the source and the streamer by a common vessel;
    e) actuating the source to produce an acoustic pulse at a predetermined location;
    f) using each sensor to receive a reflection signal and generate a respective measurement signal $S(i,x)$;
    g) receiving and storing the measurement signals $S(i,x)$ from the sensors;
    h) displacing the vessel over a distance equal to $d/2$, with d representing a horizontal distance between the sensors;
    i) repeating steps e), f), g) and h) at successive increments along a survey profile;
    j) for each signal $S(i, x+i-1)$ obtained from the i-th sensor at a location $(x+i-1)$, selecting the signal $S(N+1-i, x+N-i)$ obtained from the $(N+1-i)$th sensor at location $(x+N-i)$ to obtain a set of N/2 pairs of matching measurement signals relating to a same reflection point;
    k) for each pair in the set, comparing the matching measurement signals to perform a de-ghosting operation and provide a set of de-ghosted measuring signals relating to same common mid-points.

* * * * *